US007280982B1

(12) United States Patent
Moskowitz et al.

(10) Patent No.: US 7,280,982 B1
(45) Date of Patent: Oct. 9, 2007

(54) SYSTEM AND METHOD FOR A FEE ADDRESS SYSTEM

(75) Inventors: Paul Andrew Moskowitz, Yorktown Heights, NY (US); Philip Shi-Lung Yu, Chappaqua, NY (US); Stephen J. Boies, Mahopac, NY (US); Samuel Dinkin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/542,367

(22) Filed: Apr. 4, 2000

(51) Int. Cl.
*G06F 15/16* (2006.01)

(52) U.S. Cl. .................. 705/52; 705/67; 705/69; 379/114

(58) Field of Classification Search ................ 705/52, 705/40, 67, 69; 713/201; 379/114
See application file for complete search history.

(56) References Cited

U.S. PATENT DOCUMENTS

| 5,247,575 | A | * | 9/1993 | Sprague et al. ................ 705/53 |
| 5,508,817 | A | * | 4/1996 | Kunigami ................... 358/402 |
| 5,850,527 | A | * | 12/1998 | Suzuki ..................... 348/394.1 |
| 5,930,777 | A | * | 7/1999 | Barber ........................ 705/17 |
| 6,078,663 | A | * | 6/2000 | Yamamoto ................... 380/260 |
| 6,078,866 | A | * | 6/2000 | Buck et al. ..................... 702/2 |
| 6,151,643 | A | * | 11/2000 | Cheng et al. ................ 709/200 |
| 6,157,917 | A | * | 12/2000 | Barber ........................ 705/26 |
| 6,173,407 | B1 | * | 1/2001 | Yoon et al. .................. 713/201 |
| 6,192,114 | B1 | * | 2/2001 | Council ................... 379/114.14 |
| 6,202,056 | B1 | * | 3/2001 | Nuttall ........................ 705/52 |
| 6,272,332 | B1 | * | 8/2001 | Matsumoto et al. ...... 455/412.1 |
| 6,324,694 | B1 | * | 11/2001 | Watts et al. ................... 725/32 |
| 6,405,243 | B1 | * | 6/2002 | Nielsen ...................... 709/206 |
| 6,625,652 | B1 | * | 9/2003 | Miller et al. ................ 709/227 |
| 2001/0023432 | A1 | * | 9/2001 | Council et al. ............. 709/206 |
| 2001/0042249 | A1 | * | 11/2001 | Knepper et al. .............. 725/42 |
| 2002/0052855 | A1 | * | 5/2002 | Landesmann ............... 705/400 |
| 2002/0077897 | A1 | * | 6/2002 | Zellner et al. ................ 705/14 |
| 2002/0177977 | A1 | * | 11/2002 | Scarlat et al. ............... 702/186 |
| 2003/0004810 | A1 | * | 1/2003 | Eldering ...................... 705/14 |
| 2006/0168019 | A1 | * | 7/2006 | Levy .......................... 709/206 |

* cited by examiner

*Primary Examiner*—Firmin Backer
(74) *Attorney, Agent, or Firm*—Buckley, Maschoff & Talwalker LLc; Stephen C. Kaufman

(57) ABSTRACT

A system relating to a fee address is described. A method of directing mail to a public mailbox, determining a fee based upon the preferences of the mail recipient, receiving the fee and forwarding the mail to a private mailbox is also provided. Many different types of addresses can be employed, including for example, email, telephone, facsimile, pager, zip code and identification pin numbers. Fees may be determined by person, size, time or urgency.

64 Claims, 6 Drawing Sheets

| User 100 | Account # 102 | Preferences Record 104 | Distribution of Collected Fees 106 | General Account Institute Name 108 | Account # 110 | Recipient of Collected Fees 112 | Account # 114 |
|---|---|---|---|---|---|---|---|
| Joe Com | 12345 | All mail $0.35 | 100% to Charity A | 1st Bank | XXX | Charity A | 00015 |
| Dot Net | 67890 | Mail < 0.1 Mbits = $0.35 | 50% to Charity B | 2nd Bank | YYY | Charity B | 00016 |
| | | Mail > 0.1 Mbit = $1 | 50% to Company X | | | Company X | 33360 |
| | | Mail > 1 Mbit = $5 | | | | | |
| Sam Edu | 05678 | Mail from X = $5/piece | 50% to Firm A | 3rd Bank | BBB | Firm A | 44325 |
| | | All other mail = $0.35/piece | 50% to Sam Edu | | | Sam Edu | |

FIG. 6

SYSTEM AND METHOD FOR A FEE ADDRESS SYSTEM

FIELD OF INVENTION

This invention relates to the field of address systems and provides a method for limiting access to an address by charging a fee to send mail to that address.

BACKGROUND OF THE INVENTION

Addresses are critical to personal and business communications. Generally, addresses are the numbers and letters which define where an addressee lives, works and can be contacted, either physically or electronically. In today's environment, addresses include, for example, street addresses, telephone, fax and pager numbers, e-mail and e-phone addresses. These addresses provide highly personal information about an addressee.

There is a need in the art to control the extent and number of unsolicited messages flowing to these addresses. In the art, several methods have been described. Many of these are content based filters, which examine the content of the message in order to determine what action to take. Some systems prioritize mail based upon stored rules, either set by the computer program or designed and input by the user.

SUMMARY OF THE INVENTION

The prior techniques, however, do not discourage the sender from sending useless messages, but rather put the burden on the recipient to filter messages. Some mechanism is needed to discourage the sender from bombarding recipients with excessive or very large pieces of mail. The present system relates to charging a fee for a piece of mail capable of being processed through a central processing system. Charging a fee to send a piece of mail will dramatically cut down on the amount of junk mail received each day.

The present system relates to a system and method for providing a fee address capable of monitoring information sent and asynchronously received to a fee address, determining a fee for the information or mail wherein the fee is based on a preferences record defined by a mail recipient, collecting the fee, and forwarding the information to a private address. The fees may be fixed, or may vary depending upon the size, content or urgency of the mail, or the fee may be conditional on the recipient's determination of an appropriate fee or the recipient's response. The fees can profit the recipient or, alternatively, a third party, such as for example, a company, firm individual or charity. The fees can be settled by any consideration.

A programmed computer for providing a fee address system comprising a memory having at least one region for storing computer executable program code and a processor for executing the program stored in the memory is also described. Further, computer executable software code stored on a computer readable media is provided.

BRIEF DESCRIPTION OF THE FIGURES

FIG. 6 is a representative database of the system.

DETAILED DESCRIPTION OF THE INVENTION

Figure 1:
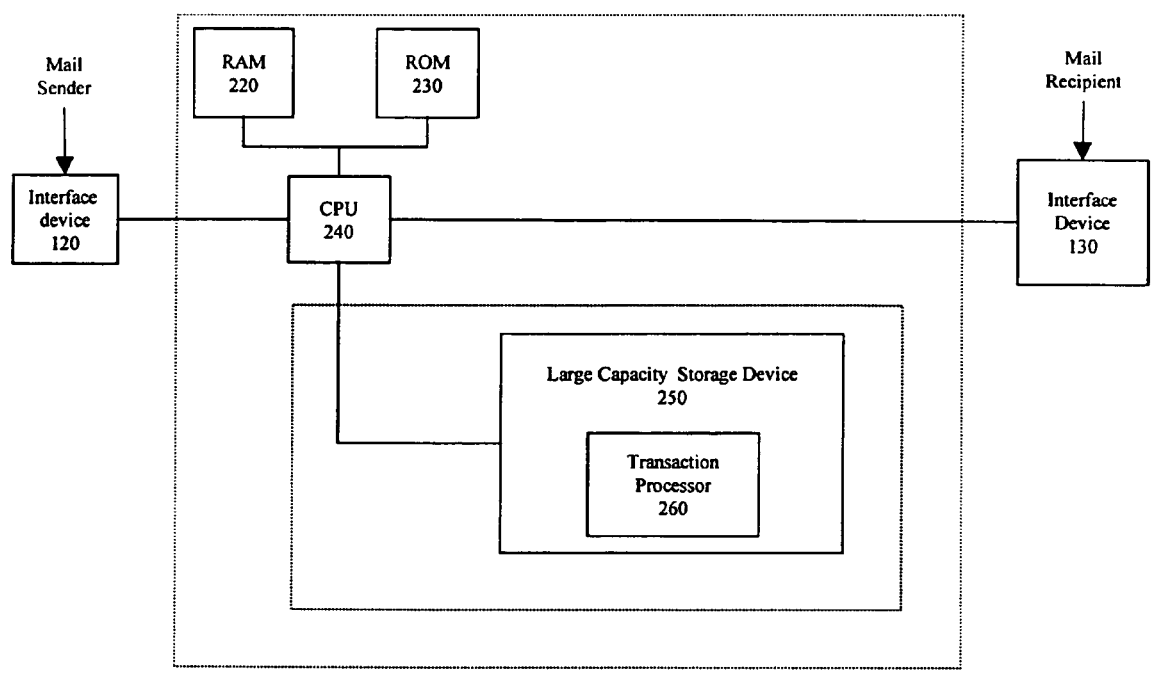
FIGS. 1 and 2 are hardware diagrams of representative systems.

The system described is directed to a technique for limiting access to an address through the charging of fees for mail. The address can be associated with any communication means capable of being processed through a central processing system. Fees can be charged based upon any parameter, including for example, by urgency, size, frequency, address or person. The fee address system comprises associating a fee with a particular piece of mail and a central processing system. The fee may be fixed, variable or conditional and may be settled by the sender with some form of consideration. The preferred settlement method is electronic check.

The central processing system of the present system involves receiving, storing and delivering messages associated with an address, and preferably comprises a computer server or computer servers, preferably connected through a network e.g. the Internet. A system and method for receiving, storing and delivering messages involves receiving an incoming signal, such as an email signal or a call and detecting public information (e.g. address) associated with the incoming signal or call, the address signal being associated with a recipient. The central processing system comprises a means for receiving an incoming signal or call, detecting an address signal on the incoming signal or call, determining the fee to be charged to that incoming message or call and determining whether payment has been made, or payment can be made upon fee determination, based upon some consideration, such as, for example, electronic check, e-money or credit card. After payment is completed, the central processing system then correlates the address provided with a private address and forwards the paid-for message to this private address. Preferably, the central processing system can receive one or more of facsimile, data or telephone addresses and data or email addresses.

In order to maintain the privacy of the user's personal account, the mail is initially sent to a public box. The fee address preferably uses symmetric key or public key cryptography such as, for example, RSA encryption to protect the private mailbox address. A 4096 bit encryption system is preferred. PGP technology or other industry standard methods may be preferably used to implement the RSA encryption. Encryption prevents others from tampering with the mail while it is in transit. An anonymous remailer system may be used to provide additional security for maintaining the privacy of the user's private mailbox. Methods are also available to verify an authenticated sender. These may be used to further secure privacy.

The present system is applicable to any type of address amenable to funneling through a central processing system or distribution system. "Address" as the term is used herein is defined as any set of numbers, letters, images, symbols or signals that direct a message or mail to a recipient. Examples of addresses include a mailing address, a telephone number, a facsimile number, a pager number, an electronic mail (i.e., email) address, video mail and electronic telephone (i.e., e-phone) address. Identification pin numbers are also a form of address. One skilled in the art will recognize many other forms of addresses amenable to use in the present system. "Mail" or "information" as those terms are used herein refers to the subject matter attached to and sent to a particular address.

"Currency" or "consideration" as these terms are used herein is any form of value that can be exchanged so that messages or mail can be successfully sent to a recipient.

Common examples of value are money, checks and debit cards. Credit cards are also a form of value in that a charge can be assessed against the sender to pay for sending a message. Electronic money can also be used. Several versions of electronic money are available or under development today. An overview of major versions of electronic money is given in the cover story and related articles in the June 1996 issue of the Byte magazine. Many such systems are available for use in the present system. One such example of an electronic monetary system is described in detail in European patent application EP 542 298 and the references contained therein.

Mail may be "prepaid" if it is associated with a stamp of sufficient value, e-money, or contains information such as a credit or debit card account number, which can be charged for the mail. If the mail is not prepaid, then the mail is held or returned to sender. If the mail is held in the central processing system, a message may be sent to the sender informing him or her of the unpaid fee associated with the mail. The sender can release the mail by providing the fee or can optionally request return of the mail. If the held mail is not paid for within a certain time period, it may be returned to the sender or simply discarded. Similarly, if the mail is not held but rather directly returned to the sender for lack of fee payment, a message may optionally be sent to the sender indicating the nature of the unpaid fee and the need to associate payment with the mail before transmission of the mail can be completed.

The fees may be fixed, varied or conditional. The recipient may charge any fee he or she deems appropriate. Any value may be attached to a piece a mail, depending upon the parameters defined by the recipient of the mail. Fees may, for example, impose an indirect limit to the number of times an address can be accessed by associating a sender with an escalating fee schedule. Alternatively, fees may be based upon the size or weight of the mail, or on the address or person sending the mail. If the fee is based upon the size or weight of the mail, this parameter may be measured, for example, by word count or in bits. Fees may be based upon the urgency of the mail and just how quickly the sender would like to have his or her message read. Alternatively, fees may be fixed at a particular price, regardless of the type, size or sender of the mail. Fees may also be waived for certain senders. When the fee is based upon a usage number, each time a piece of mail is received in the central processing system, the system will, for example, add one to the total usage number, thereby updating the usages for the sender and increasing the fee for the next piece of mail to be received from that sender.

Alternatively, the fee may be based upon time; i.e. an address may only be accessed for a given fee, be it fixed or variable for X number of days, weeks or months. In this embodiment, the central system will charge a given fee for a set time period which may be started for example by the sender's first usage of the address or by a period of time set by the recipient.

Yet another type of fee may be a conditional fee. For example, a fee based upon the content of the mail or the urgency with which the recipient is requested to read the mail may have conditional fees associated with the mail. In this embodiment, the recipient may receive a mail and either before or after the recipient has opened the mail, the recipient determines the appropriate price for the mail. Any further analysis of the mail and/or response to the mail is dependent upon the receipt of payment of the assessed fee. In this embodiment, it may be preferred to substitute the mail recipient for the preferences record. In other words, the mail is forwarded directly to the mail recipient for determination of the appropriate fee. The fee is charged and once payment is made the mail recipient analyzes the mail and may optionally respond to it.

The fee charging parameters are defined by the mail recipient and are stored in a preferences record. This record is referenced each time a piece of mail is received and a fee determination is made. The central processing system reads the preferences record to determine whether the fee is flat, variable or conditional. If the fee is flat for some senders, then the central processing system identifies the sender of the mail, to determine if the rate is flat for this particular sender. If the fee is flat for all mail or for the particular sender, the central processing system refers to the preferences record to determine the amount to charge. If the fee is variable depending upon size, the central processing system determines the size of the mail. Based upon this determination, the central processing system refers to the preferences record to determine the cost of the mail. If the sender is on the list of addresses for whom the fee is waived, as recorded in the preferences record, then the central processing system recognizes this mail as already paid-for and directly forwards it to the recipient's private mailbox. If the mail has an "urgent" notice or is a "priority" mailing, the preferences record is queried as to whether an additional charge is associated with such mail. The preferences record can be accessed by the fee address owner and the preferences may be changed or updated as desired.

Once the mail recipient receives a paid-for piece of mail, the system provides a mechanism to refund the fee at the mail recipient's option. It may be the case that a particular piece of mail was charged a fee as defined by the preferences record, but after consideration by the recipient, he or she determines the fee was not desired, i.e. the mail came from a friend, for example. The refund feature allows the recipient to reverse the charge and give the sender a fee refund.

The money collected from the fees can be distributed in a number of ways. It may be desired that the recipient of the mail receive the collected fees. Alternatively, the collected fees may be donated to one or more charities. The collected fees may also be given to a firm, company or other third party. The transfer of collected fees is preferably mediated through a bank or collecting agency. The mail recipient preferably sets up an account to receive collected fees. This account collects fees, and then forwards these fees to the party or parties identified by the mail recipient to receive the funds. Alternatively, the fee address provider may provide an account for the general collection of fees, which it then transfers to the accounts identified by the mail recipient to receive the funds.

With reference to the several views of the drawings, there are depicted several embodiments of the fee address system, described hereinbelow.

As shown in FIG. 1, a general central processing system preferably includes a central processing unit (CPU) 240, random access memory (RAM) 220, read-only memory (ROM) 230 and large capacity storage device 250. Optionally, a calendar and/or clock may be included to track time. CPU preferably comprises a conventional microprocessor such as an Intel Pentium Processor and is electronically coupled to each of the central controller's other elements.

The CPU executes program code stored in one or more of RAM, ROM and storage device to carry out the functions and acts described in connection with the central processing system. The CPU preferably comprises at least one high-speed digital data processor adequate to execute program modules for determining fees to be charged, transacting payment and forwarding mail to private addresses. These modules are described, for example, in connection with FIGS. 3 and 4. The CPU interacts with RAM, ROM and storage device to execute stored program code according to conventional data processing techniques.

Figure 2:
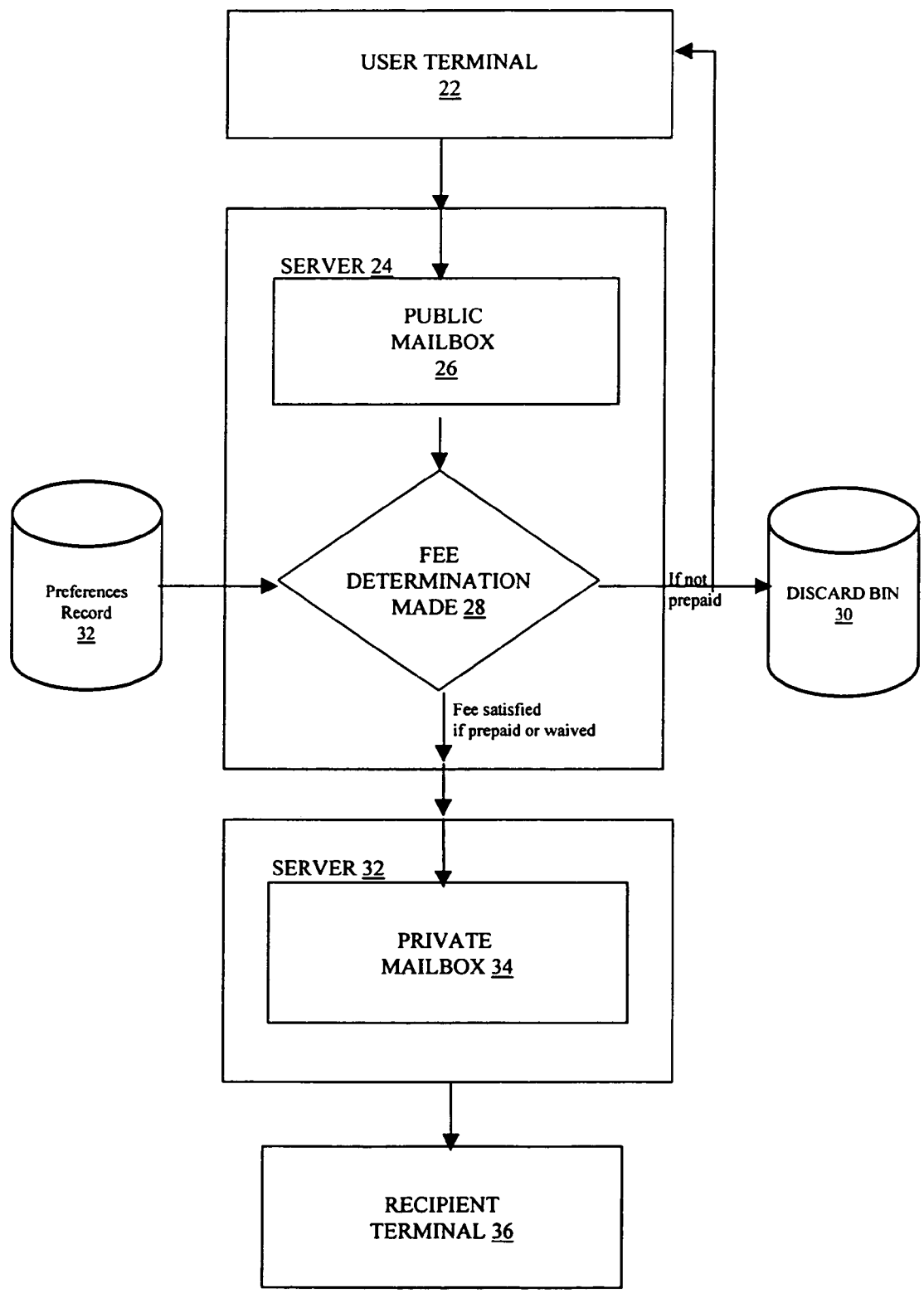

User interface devices comprise devices for allowing the central processing system to communicate with senders and recipients using fee addresses, e.g. a computer or telephone. FIG. 2 illustrates this system. The user terminal, 22 communicates with a server, 24 which receives the mail associated with the fee address into a public mailbox, 26. Next, a toll determination is made, 28, as to if a fee is to be charged and if so, the cost of the mail based upon its size, address and any other parameters recorded in the recipient's stored preferences record, 32. If the toll is satisfied, the mail is forwarded to a private address, 34. This private address may be located in a separate server, 32 as illustrated in FIG. 2 or may be part of the first server, 24. The paid mail is then forwarded to the recipient's terminal, 36. If no payment is received, the message/mail associated with the fee address is moved to the discard bin, 30. Alternatively, the denied mail may be returned to the user terminal, 22.

Figure 3:
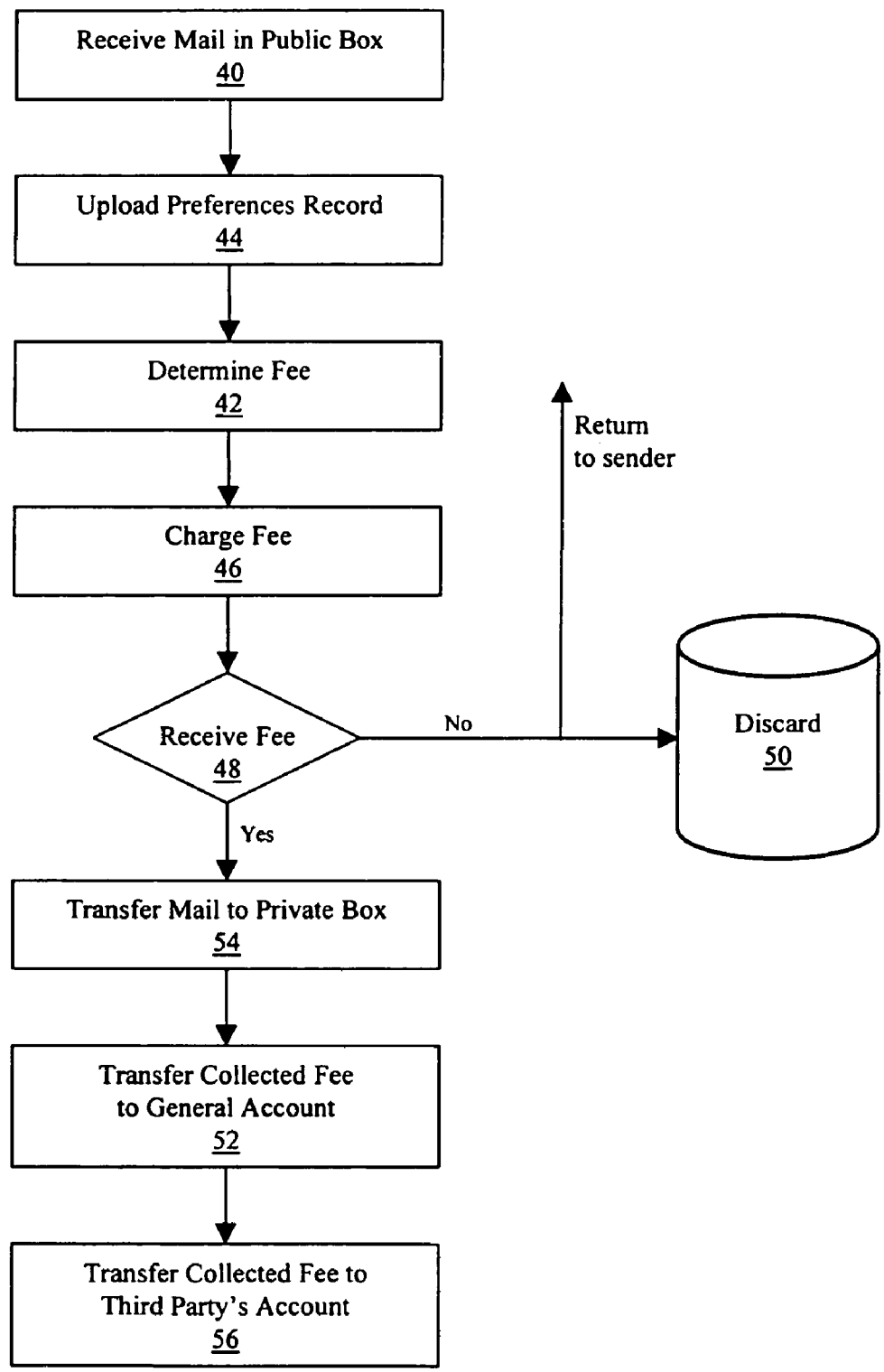
FIG. 3 is a flowchart illustrating an embodiment of the system.

In one embodiment of the system shown in FIG. 3, a fee address is used to send a piece of mail. The mail is received in a public mailbox, 40. The central processing system then uploads the stored preferences record, 44, in order to determine the appropriate fee for the received mail, 42. Fee determination is primarily concerned with at least one of the following: the type of mail, the sender's address, the size of the mail or the frequency or urgency of the mail. Other similar parameters will be known to the skilled artisan and are included in the present system. The fee determination is preferably based upon the preferences provided by the recipient. Once the appropriate fee is determined, the fee is charged, 46. If the mail is prepaid, the fee is received, 48, and transferred into a general account, 52. Prepaid mail may have a stamp attached to it or may contain credit card or debit card information. Prepaid mail may also use e-money or some other form of instantly redeemable currency. A general account is provided by the mail recipient or through the fee address provider at the time the fee address is set up (see FIG. 4, described below). This general account may be a bank account or some similar account capable of receiving, maintaining and distributing funds. If the mail is not prepaid, the mail is forwarded to a discard bin, 50. Alternatively, this rejected mail may be returned to the sender. The receipt of the fee also triggers the central processing system to forward the mail to a private mail box, 54, where it can be accessed by the recipient. The collected fees in the general account may be transferred to a third party's account, 56, if the recipient has designated a third party to receive the proceeds from the fee address.

Figure 4:
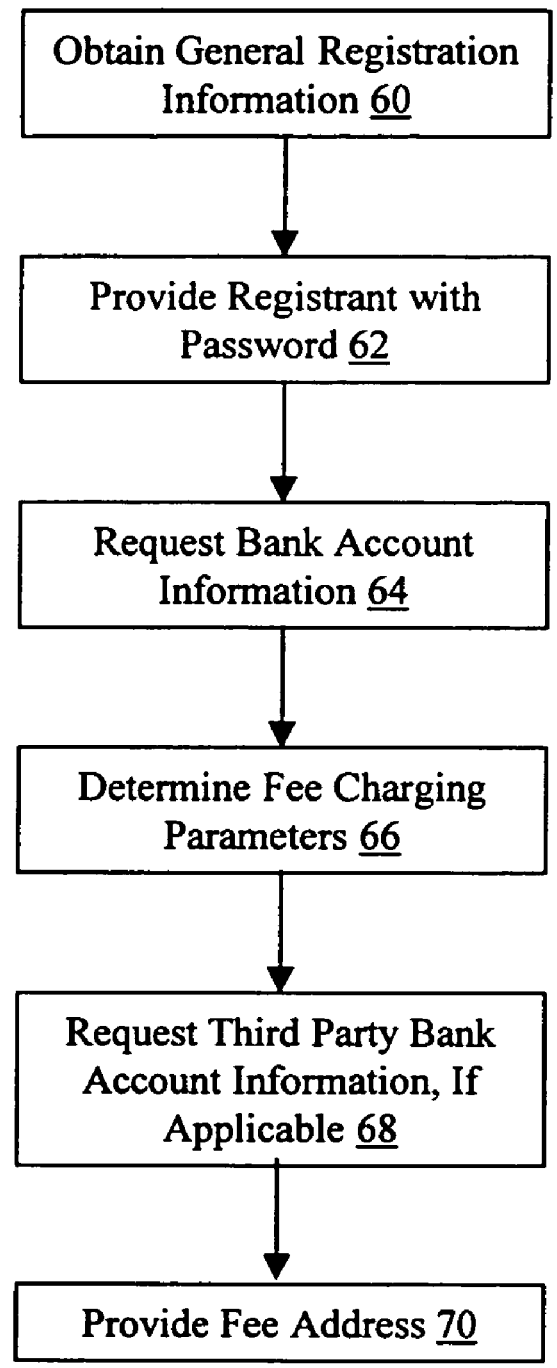
FIG. 4 is a flowchart illustrating the set up procedure.

FIG. 4 illustrates one embodiment of a set up protocol. In this embodiment, an eventual recipient of mail wishes to obtain a fee address for his or her mail. The recipient can register the necessary information through a computer network. Preferably, this computer network is the internet. In order to register, general registration information is requested, 60. Such information may include, for example, the registrant's name and address. Other forms of communication, such as telephone or fax numbers may also be requested in the general registration section. Next, the registrant is provided with a log-in password, 62. This password is provided to protect the registrant's privacy and the security of the account. Once the registrant has logged-in, the system may request the mail recipient's bank account information, 64. This account may act as the general account for accepting fees from charged mail. This general account may be associated with a traditional bank or alternatively, may be associated with some other collection agency capable of collecting, maintaining and transferring funds. Alternatively, the provider of the fee address may provide a general account for collected fees, in which case, the mail recipient's account information is only necessary if the mail recipient designates himself as the (or one of the) funds recipients.

In any case, the system then prompts the registrant to provide the parameters for charging fees for mail, 66. For example, the registrant may indicate a flat fee of $0.35 is to be charged for mail regardless of size or sender. A different registrant may indicate that the fee is to be based upon size and mail less than a given size is to be charged X, but mail greater than or equal to this given size is to be charged 2X. X may be any amount of money or currency. Yet another registrant may indicate that all mail is to be charged $1 if the sender wishes the mail to be opened today, but is charged $0.50 if the sender has a lesser priority, i.e. the mail can be read tomorrow or some time in the future. Also, a registrant may indicate a wish to waive the fee for mail from a particular sender, or in the alternative, may waive charges for all but certain addressees. These parameters may vary from sender to sender, i.e. what may be fixed for certain senders, may be variable depending upon size, for example, for a different set of senders. Different combinations of parameters may be set by certain registrants.

In any case, once the fee parameters have been registered, the registrant is prompted to indicate whether the received funds from collected fees are to be held in the general account or forwarded to one or more third party accounts. If a third party account is indicated, the registrant is prompted to provide the third party's name and account information, 68. For example, it may be necessary to identify the name of the institution where the account is located and the account number. Such institution may be a bank or some similar institution capable of receiving funds. Finally, the system provides the registrant with a fee address, 70, which is used to send mail to the registrant for a fee.

Figure 5:
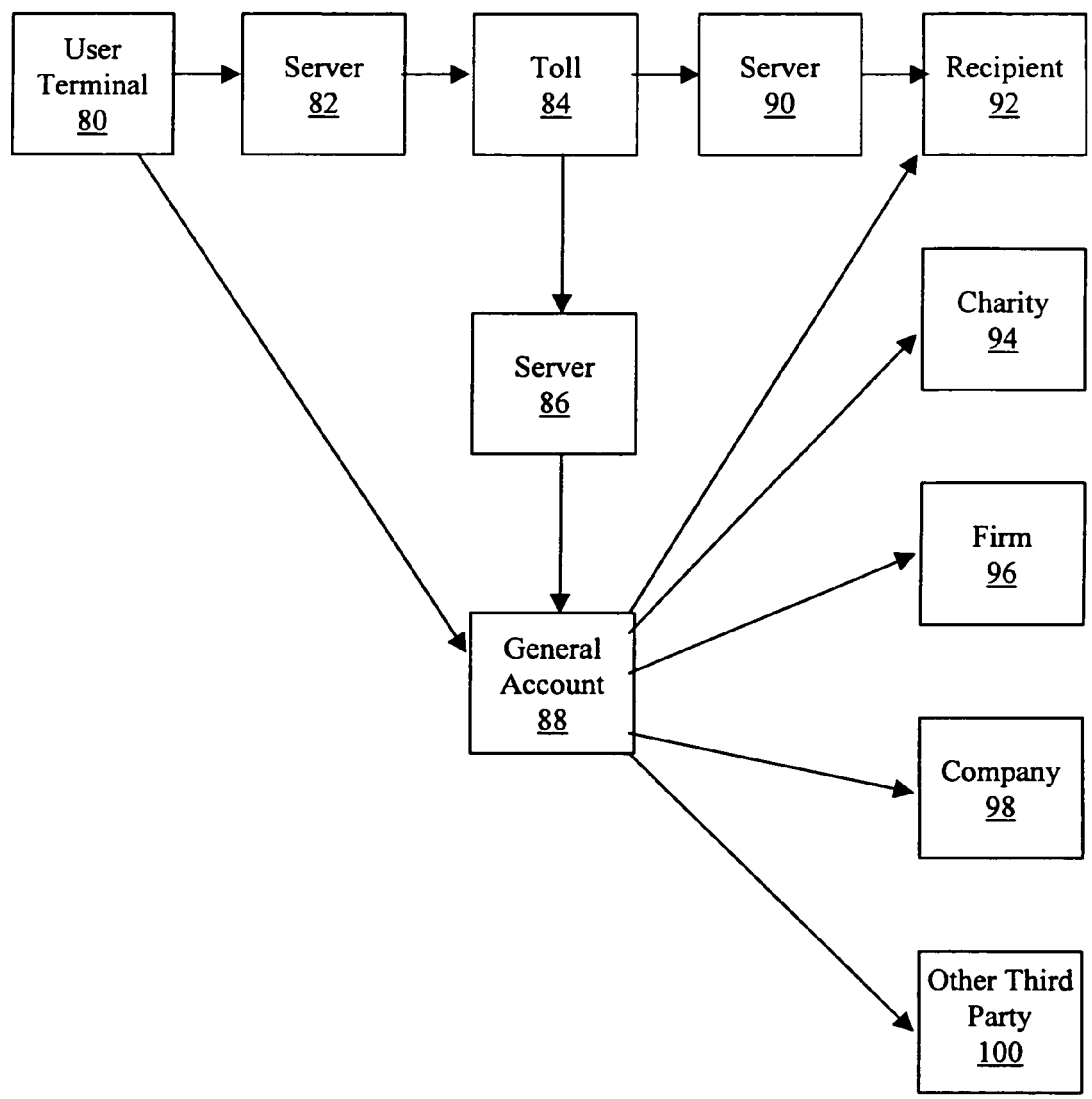
FIG. 5 is a hardware diagram of a representative system.

FIG. 5 illustrates the system through the use of multiple servers. The system may employ multiple servers or may conduct the various functions of the system through one central server. In FIG. 5, the mail is transferred from the user's terminal, 80, to a first server, 82, which determines the fee or toll to be charged for that piece of mail, 84. Once the fee is charged and received, the mail is forwarded to a second server, 90, while the fee collected from the mail is transferred to a third server, 86. The second server receives the mail and places it into a private mailbox, which can be accessed by the recipient, 92. The third server receives the funds collected from the mail fee and places it in a general account, 88. This general account may be directly accessible to the mail recipient, so that if the mail recipient is also the funds recipient, no further transfer of the funds may be necessary. Alternatively, the general account may be associated with the provider of the fee address. In this case, a transfer from the general account the mail recipient's account may be necessary, 92. If a charity organization has been designated as a funds recipient, the collected funds are transferred from the general account to the charity's account, 94. Similarly, if a company, 98, or a firm, 96, or other third party, 100, have been designated funds recipients, the collected funds are transferred to the designated accounts.

The large capacity storage device 250 described in FIG. 1 includes a transaction processor 260. The transaction processor maintains, determines and accesses the preferences records, determines fees associated with particular pieces of mail, and correlates the payment of the fee with transfer of the mail to private addresses. The transaction processor may comprise one or more separate, conventional CPU/microprocessor(s) or a portion of the operating function of the CPU.

A sample of the contents of a database for one embodiment of the present system is shown in FIG. 6. The specific data and fields illustrated in this figure are for the most part self-explanatory. It is understood that the data and fields, as well as the number of databases, can be readily modified from the exemplary embodiment and may be adapted to provide variations for operating the system and method described. Furthermore, each field may contain more or less information. For example, the general account information may only be required if the provider of the fee address does not operate a suitable accounting system, or if the recipient designates himself to receive the collected fees.

FIG. 6 illustrates a sample database containing the entries of several registrants of the present system. This example database contains fields corresponding to the user's name, 100, the user's account number, 102, the preferences record, 104, the distribution schedule for collected fees, 106, a general account name, 108, and number, 110, the name of the recipient(s) of the collected fees, 112, and the account name and number, 114 for the collected fees. The general account information is used primarily in two situations; (1) if the provider of the fee address does not provide a general account for the collection of fees; and/or (2) if the mail recipient is also the collected fees recipient. In these two situations, general account information may be desirable. In the first instance, the general account forms the initial depository for collected fees. In the second situation, the general account is preferably the final destination of the funds. It may also be the case that the general account is both the initial depository and the final destination of the funds. When a mail recipient designates himself to collect a portion of the collected fees, it may be desirable to provide separate account information for storing that portion of the collected fees.

The above description of various preferred embodiments has been presented for purposes of illustration and description. It is not intended to be exhaustive or limiting to the precise forms disclosed. Obvious modifications or variations are possible in light of the above teachings. The embodiments discussed were chosen and described to provide illustrations and its practical application to thereby enable one of ordinary skill in the art to utilize the various embodiments and with various modifications as are suited to the particular use contemplated. All such modifications and variations are within the system as determined by the appended claims when interpreted in accordance with the breadth to which they are fairly, legally and equitably entitled.

The invention claimed is:

1. An e-mail address system, comprising:
means for monitoring information sent by a sender and asynchronously received at a public fee address associated with an e-mail recipient, wherein the information is unsolicited by the e-mail recipient;
means for determining a fee for the information, wherein the fee is based upon a preferences record defined by the e-mail recipient;
means for collecting the fee from the sender into a first account;
means for forwarding the information received at the public fee address to a private e-mail address associated with the e-mail recipient; and
means for transferring the collected fee to a second account.

2. The address system of claim 1, wherein the second account belongs to a third party.

3. The address system of claim 1, wherein the fees are escalating based upon number of usages.

4. The address system of claim 1, wherein the fees are conditional.

5. The address system of claim 1, wherein the fees are a combination of fixed, variable and conditional for different senders.

6. The address system of claim 1 wherein the fee is waived for a sender.

7. The address system of claim 1 wherein the fee is based upon the urgency of the information.

8. The address system of claim 1 wherein the fees are selected from the group consisting of fixed, variable or conditional.

9. The address system of claim 1 wherein the fee is based on the size of the information.

10. The address system of claim 2 wherein the third party is a charity organization.

11. The address system of claim 2 wherein the third party is a company.

12. The address system of claim 2 wherein the third party is an individual.

13. The address system of claim 2 wherein the third party is a firm.

14. The address system of claim 1 wherein the fee varies for different senders.

15. The address system of claim 9 wherein the size of the information is based on word count.

16. The address system of claim 9 wherein the size of the information is based on number of bits.

17. The address system of claim 4, wherein the e-mail recipient elects to impose a fee.

18. An e-mail address system, comprising:
means for monitoring information sent by a sender and asynchronously received at a public fee address associated with an e-mail recipient, wherein the information is unsolicited by the e-mail recipient;
means for determining a fee for the information, wherein the fee is based upon a preferences record defined by the e-mail recipient and the fee is conditional;
means for collecting the fee from the sender; and
means for forwarding the information received at the public fee address to a private e-mail address associated with the e-mail recipient.

19. The address system of claim 18, wherein the e-mail recipient elects to impose a charge.

20. The address system of claim 18, wherein the e-mail recipient receives a portion of the collected fees.

21. A method of providing an e-mail fee address system, comprising:
receiving information sent by a sender at a public fee address in a computer, wherein the public fee address is associated with an e-mail recipient, and wherein the information is unsolicited by the e-mail recipient;
determining a fee for the information, wherein the fee is based upon a preferences record defined by the e-mail recipient and the fee increases as information size increases;
collecting the fee from the sender; and forwarding the information from the public fee address to a private e-mail address associated with the e-mail recipient.

22. The method of claim 21, wherein the information size is measured by word count.

23. The method of claim 21, wherein the information size is measured in bits.

24. The method of claim 21 further comprising transferring the collected fees to a third party.

25. The method of claim 24 wherein the third party is a charity.

26. The method of claim 24 wherein the third party is a firm.

27. The method of claim 24 wherein the third party is an individual.

28. The method of claim 24 wherein the third party is a company.

29. The method of claim 21 wherein the information is electronic mail.

30. A programmed computer for providing an e-mail fee address system, comprising:
  a memory having at least one region for storing computer executable program code; and
  a processor for executing the program code stored in memory, wherein the program code includes:
    code to receive an e-mail sent by a sender to a public fee address associated with an e-mail recipient, wherein the e-mail is unsolicited by the e-mail recipient;
    code to determine a fee for the e-mail, wherein the fee is based upon a preferences record defined by the e-mail recipient;
    code to collect the fee from the sender into a first account;
    code to forward the e-mail from the public fee address to a private e-mail address associated with the e-mail recipient; and
    code to transfer the collected fee to a second account.

31. The programmed computer of claim 30 wherein the second account belongs to a third party.

32. The programmed computer of claim 30, wherein the fees are escalating based upon number of usages.

33. The programmed computer of claim 30, wherein the fees are conditional.

34. The programmed computer of claim 30, wherein the fees are a combination of fixed, variable and conditional for different senders.

35. The programmed computer of claim 30 wherein the fee is waived for a sender.

36. The programmed computer of claim 30, wherein the fee is based upon the urgency of the e-mail.

37. The programmed computer of claim 30 wherein the fees are selected from the group consisting of fixed, variable or conditional.

38. The programmed computer of claim 30, wherein the fee is based on the size of the e-mail.

39. The programmed computer of claim 31 wherein the third party is a charity organization.

40. The programmed computer of claim 31 wherein the third party is a company.

41. The programmed computer of claim 31 wherein the third party is an individual.

42. The programmed computer of claim 31 wherein the third party is a firm.

43. The programmed computer of claim 30 wherein the fee varies for different senders.

44. The programmed computer of claim 38, wherein the size of the e-mail is based on word count.

45. The programmed computer of claim 38, wherein the size of the e-mail is based on number of bits.

46. The programmed computer of claim 33, wherein the e-mail recipient elects to impose a fee.

47. Computer executable software code stored on a computer readable medium, the code for providing an e-mail fee address system, comprising:
  code to receive a communication sent by a sender to a public fee address associated with an e-mail recipient, wherein the communication is unsolicited by the e-mail recipient;
  code to determine a fee for the communication, wherein the fee is based upon a preferences record defined by the e-mail recipient;
  code to collect the fee; and
  code to forward the communication from the public fee address to a private e-mail address associated with the e-mail recipient.

48. A method of providing an e-mail fee address system, comprising:
  receiving an e-mail sent by a sender to a public fee address in a computer wherein the public fee address is associated with an e-mail recipient, and wherein the e-mail is unsolicited by the e-mail recipient;
  determining a fee for the e-mail, wherein the fee is based upon a preferences record defined by the e-mail recipient;
  collecting the fee from the sender into a first account;
  forwarding the e-mail from the public fee address to a private e-mail address associated with the e-mail recipient; and
  transferring the collected fee to a second account.

49. The method of claim 48, wherein the second account belongs to a third party.

50. The method of claim 48, wherein the fees are escalating based upon number of usages.

51. The method of claim 48, wherein the fees are conditional.

52. The method of claim 48, wherein the fees are a combination of fixed, variable and conditional for different senders.

53. The method of claim 48 wherein the fee is waived for a sender.

54. The method of claim 48, wherein the fee is based upon the urgency of the e-mail.

55. The method of claim 48 wherein the fees are selected from the group consisting of fixed, variable or conditional.

56. The method of claim 48, wherein the fee is based on the size of the e-mail.

57. The method of claim 49 wherein the third party is a charity organization.

58. The method of claim 49 wherein the third party is a company.

59. The method of claim 49 wherein the third party is an individual.

60. The method of claim 49 wherein the third party is a firm.

61. The method of claim 48 wherein the fee varies for different senders.

62. The method of claim 56, wherein the size of the e-mail is based on word count.

63. The method of claim 56, wherein the size of the e-mail is based on number of bits.

64. The method of claim 51, wherein the e-mail recipient elects to impose a fee.

* * * * *